United States Patent
Weber et al.

(10) Patent No.: US 9,018,300 B2
(45) Date of Patent: Apr. 28, 2015

(54) REINFORCED THERMOPLASTIC MOLDING COMPOSITIONS, PROCESSES FOR PREPARING SUCH COMPOSITIONS, MOLDING MADE WITH SUCH COMPOSITIONS AND USES THEREFOR

(75) Inventors: Martin Weber, Maikammer (DE); Klaus Muehlbach, Gruenstadt (DE); Peter Ittemann, Lampertheim (DE); Stefan Grutke, Neustadt (DE); Nicolas Inchaurrondo, Mannheim (DE)

(73) Assignee: Styrolution Europe GmbH (DE)

( * ) Notice: Subject to any disclaimer, the term of this patent is extended or adjusted under 35 U.S.C. 154(b) by 642 days.

(21) Appl. No.: 11/917,552

(22) PCT Filed: Jun. 13, 2006

(86) PCT No.: PCT/EP2006/063125
§ 371 (c)(1),
(2), (4) Date: Dec. 14, 2007

(87) PCT Pub. No.: WO2006/134096
PCT Pub. Date: Dec. 21, 2006

(65) Prior Publication Data
US 2008/0207821 A1 Aug. 28, 2008

(30) Foreign Application Priority Data
Jun. 14, 2005 (DE) .......................... 10 2005 027 485

(51) Int. Cl.
| | | |
|---|---|---|
| C08L 37/00 | (2006.01) | |
| C08L 67/02 | (2006.01) | |
| C08L 77/00 | (2006.01) | |
| C08L 25/04 | (2006.01) | |
| C08L 25/18 | (2006.01) | |
| C08K 7/14 | (2006.01) | |
| C08L 35/06 | (2006.01) | |

(52) U.S. Cl.
CPC ................ C08L 25/04 (2013.01); C08L 25/18 (2013.01); *C08K 7/14* (2013.01); *C08L 35/06* (2013.01)

(58) Field of Classification Search
CPC .......... C08L 37/00; C08L 67/02; C08L 77/00
USPC ............ 524/517, 504; 525/64, 165, 166, 177, 525/178
See application file for complete search history.

(56) References Cited

U.S. PATENT DOCUMENTS 4,939,201 A * 7/1990 Seiler et al. ................... 524/504
5,304,591 A 4/1994 Nowakowsky et al.

FOREIGN PATENT DOCUMENTS

| CA | 1056975 | 6/1979 |
|---|---|---|
| DE | 1260135 | 2/1968 |
| DE | 1949487 | 4/1971 |
| DE | 2427960 | 6/1975 |
| DE | 3515867 A1 | 11/1986 |
| DE | 4114248 A1 | 11/1992 |
| EP | 0303919 A2 | 2/1989 |
| GB | 1124911 | 8/1968 |
| GB | 1315219 | 5/1973 |
| WO | WO 2004/055107 | * 7/2004 |

OTHER PUBLICATIONS

R. Gächter, et al., "Taschenbuch der Kunststoffadditive [Plastics additives handbook]," *Carl Hanser Verlag* (1983), pp. 494-510.
G. Benzing, "Pigmente für Anstrichmittel [Pigments for paints]," *Expert-Verlag* (1988), pp. 78-106.
Gilbert, "Emulsion Polymerization, A Mechanistic Approach," pp. 12-14, (Academic Press, London San Diego (1995)).

* cited by examiner

*Primary Examiner* — James J Seidleck
*Assistant Examiner* — Deve E Valdez
(74) *Attorney, Agent, or Firm* — Drinker Biddle & Reath LLP

(57) ABSTRACT

Molding compositions comprising: a composition (I) present in an amount of 10 to 100% by weight, based on the molding composition, wherein the composition (I) comprises: (A) 40 to 95% by weight, based on the composition (I), of a copolymer comprising: α-methylstyrene in an amount of 55 to 90% by weight, acrylonitrile in an amount of 10 to 50% by weight, and one or more other monomers in an amount of 0 to 5% by weight, wherein the percentages by weight of the α-methylstyrene, the acrylonitrile and the one or more other monomers are based on the weight of component (A); (B) 2.5 to 75% by weight, based on the composition (I), of a polymer comprising: a vinylaromatic monomer in an amount of 60 to 90% by weight, acrylonitrile in an amount of 8.01 to 39.8% by weight, and maleic anhydride in an amount of 0.2 to 1.99% by weight, wherein the percentages by weight of the vinylaromatic monomer, the acrylonitrile and the maleic anhydride are based on the weight of component (B); and (C) 2.5 to 60% by weight, based on the composition (I), of glass fibers.

19 Claims, No Drawings

REINFORCED THERMOPLASTIC MOLDING COMPOSITIONS, PROCESSES FOR PREPARING SUCH COMPOSITIONS, MOLDING MADE WITH SUCH COMPOSITIONS AND USES THEREFOR

CROSS-REFERENCE TO RELATED APPLICATIONS

This application is a national stage application, under 35 U.S.C. §371, of PCT/EP2006/063125, filed Jun. 13, 2006, which claims priority of German Patent Application No. 10 2005 027 485.4, filed Jun. 14, 2005.

BACKGROUND OF THE INVENTION

The prior art has in principle disclosed reinforced thermoplastic molding compositions based on styrene copolymers.

The use of fillers and reinforcing substances for modification of properties is attractive in amorphous materials. However, there are so far only a few examples of attempts to add fillers to styrene copolymers.

DE 41 14 248 A1 discloses thermoplastic molding compositions composed of from 40 to 95% by weight of a copolymer A composed of from 90 to 50% by weight of styrene, of α-methylstyrene, of a ring-substituted styrene derivative, or of mixtures of these monomers, and from 10 to 50% by weight of acrylonitrile, up to 50% by weight of a graft copolymer as component B, from 1 to 50% by weight of a reinforcing agent based on an inorganic glass as component C, and also from 0.1 to 50% by weight of a terpolymer D based on styrene-methyl methacrylate-maleic anhydride, and, if appropriate, other comonomers in each case using from 1 to 15% by weight of styrene and maleic anhydride and using a styrene-maleic anhydride ratio of from 5:1 to 1:5.

EP 0 303 919 A2 likewise discloses reinforced thermoplastic molding compositions, composed of three components A, B, and C. This molding composition comprises, as component A, from 40 to 94% by weight of a copolymer, composed of from 90 to 50% by weight of styrene, of α-methylstyrene, of a ring-alkyl-substituted styrene derivative, or of mixtures of these monomers, and from 10 to 50% by weight of (meth) acrylonitrile and/or methyl(meth)acrylate. The molding composition comprises, as component B, from 20 to 0.5% by weight of a terpolymer, composed of from 90 to 50% by weight of at least one monomer from the group consisting of styrene, of α-methylstyrene, of the ring-alkyl-substituted styrenes, or of mixtures of these monomers, from 5 to 40% by weight of (meth)acrylonitrile and/or methyl(meth)acrylate, and from 2 to 30% by weight of another monomer, and it is essential here that the terpolymer B comprise tert-butyl (meth)acrylate as other monomer. The molding compositions also comprise from 5 to 50% by weight of a reinforcing agent as component C.

DT 1 949 487 discloses thermoplastic molding compositions based on copolymers composed of maleic anhydride, styrene, and acrylonitrile, and copolymers composed of styrene or α-methylstyrene, and acrylonitrile or methacrylonitrile. The molding compositions according to DT 1 949 487 have high heat resistance but are too brittle for many applications.

DE 35 15 867 A1 discloses reinforced thermoplastic molding compositions, composed of component A from 5 to 95% by weight of at least one copolymer, composed of from 90 to 50% by weight of styrene, of α-methylstyrene, of a ring-alkyl-substituted styrene derivative, or of mixtures of these monomers, and of from 10 to 50% by weight of (meth) acrylonitrile, and also component B from 95 to 5% by weight of at least one terpolymer comprising styrene as monomer unit, and, as component C, from 5 to 50% by weight of a reinforcing agent. According to DE 35 15 867 A1, the molding composition comprises, as terpolymer B, a terpolymer which is composed of from 90 to 59% by weight of a monomer from the group consisting of styrene, of α-methylstyrene, of the ring-alkylated styrenes, or of mixtures of these monomers, from 8 to 48% by weight of (meth)acrylonitrile, and from 2 to 30% by weight of a monomer from the group consisting of acrylic acid, of methacrylic acid, of maleic anhydride, or of mixtures of these monomers. The molding composition comprises, as reinforcing agent C, glass fibers known per se.

All of the terpolymers B used according to the examples of DE 35 15 867 A1 comprise a proportion of maleic anhydride which is 5% by weight or higher.

The heat resistance of the molding compositions according to DE 35 15 867 A1 in particular is too low for most applications.

BRIEF SUMMARY OF THE INVENTION

The present invention relates to molding compositions comprising a composition I, composed of a copolymer comprising α-methylstyrene and acrylonitrile, and also, if appropriate, other monomers as component A, a polymer B, composed of a vinylaromatic monomer, acrylonitrile, and maleic anhydride as component B, and also glass fibers as component C, to processes for production of such molding compositions, and also to the use of such molding compositions for production of a molding.

It was therefore an object of the present invention to provide reinforced molding compositions based on styrene copolymers with high heat resistance and good flowability.

Another object of the present invention was to provide reinforced molding compositions based on styrene copolymers with high heat resistance and good flowability and simultaneously good impact resistance.

According to the invention, this object is achieved via a molding composition comprising from 10 to 100% by weight of a composition I, composed of A) from 40 to 95% by weight, based on the weight of the composition I, of a copolymer comprising
  from 55 to 90% by weight, based on the weight of component A, of α-methylstyrene,
  from 10 to 50% by weight, based on the weight of component A, of acrylonitrile,
  and also
  from 0 to 5% by weight, based on the weight of component A, of other monomers
  as component A;
B) from 2.5 to 75% by weight, based on the weight of the composition I, of a polymer B, composed of
  from 60 to 90% by weight, based on the weight of component B, of a vinylaromatic monomer
  from 8.01 to 39.8% by weight, based on the weight of component B, of acrylonitrile,
  from 0.2 to 1.99% by weight, based on the weight of component B, of maleic anhydride
  as component B; and
C) from 2.5 to 60% by weight, based on the weight of the composition I, of glass fibres as component C,
the entirety of components A, B and C giving 100% by weight.

The terpolymer B present in the inventive molding compositions comprises from 0.2 to 1.99% by weight of maleic anhydride.

Surprisingly, it has been found that the inventive molding compositions exhibit a favorable combination derived from high heat resistance, impact resistance, and flowability. By way of example, the inventive molding compositions feature high tensile strain at break and high impact resistance.

The inventive molding compositions can comprise other components alongside the composition I.

DETAILED DESCRIPTION OF THE INVENTION

A feature of the inventive molding compositions is that they comprise from 10 to 100% by weight, in particular from 10 to 99.999% by weight, of a composition I which is composed of components A, B, and C.

The inventive molding compositions preferably comprise from 20 to 80% by weight of the composition I, in particular from 30 to 70% by weight, for example from 35 to 65% by weight, particularly preferably from 40 to 60% by weight.

The composition I here comprises, as component A, from 40 to 95% by weight, preferably from 45 to 92.5% by weight, and particularly preferably from 50 to 90% by weight, based in each case on the weight of the composition I, of at least one copolymer comprising from 55 to 90% by weight, based on the weight of component A, of α-methylstyrene and from 10 to 50% by weight, based on the weight of component A, of acrylonitrile, and also from 0 to 5% by weight, based on the weight of component A, of other monomers.

According to the invention, the copolymers A are composed of from 55 to 90% by weight, based on the weight of component A, of α-methylstyrene and from 10 to 50% by weight, based on the weight of component A, of acrylonitrile, and also from 0 to 5% by weight, based on the weight of component A, of other monomers.

By way of example, the copolymer A is composed of from 60 to 80% by weight, in particular from 65 to 75% by weight, of α-methylstyrene, and from 20 to 40% by weight, in particular from 25 to 35% by weight, of acrylonitrile, and also from 0 to 4.5% by weight, preferably from 0.01 to 4% by weight, with preference from 0.1 to 3.5% by weight, in particular from 0.2 to 3% by weight, of other monomers, based in each case on the weight of component A, the entirety of the monomers giving 100% by weight.

According to the invention, examples of suitable other monomers are vinylaromatic compounds, such as styrene or alkyl-substituted styrene derivatives, or alkylalkyl acrylates, for example those having C1-C8-alkyl radicals, and also C1-C8-alkylacrylonitrile, preferably C1-C4-alkylnitrile, or mixtures of these compounds.

For the purposes of the present invention, the composition I particularly preferably comprises a copolymer A which is composed of 70% by weight of α-methylstyrene and 30% by weight of acrylonitrile, based in each case on the weight of component A.

The copolymers A are known per se or can be prepared by methods known per se. By way of example, they can be prepared via free-radical polymerization, in particular via emulsion polymers, via suspension polymers, via solution polymers, or via bulk polymers. Such copolymers are also often produced as by-products during the graft copolymerization reaction to prepare component D, particularly if large amounts of monomers are grafted onto small amounts of rubber.

The viscosity numbers of the copolymers A are preferably in the range from 40 to 160. This corresponds to average molar masses Mw (weight average) in the range from 40 000 to 500 000 g/mol.

The composition I present in the inventive molding compositions also comprises a component B. The composition I comprises, as component B, from 2.5 to 75% by weight, based on the weight of the composition I, of a polymer B, composed of from 60 to 90% by weight, based on the weight of component B, of a vinylaromatic monomer, from 8.01 to 39.8% by weight, based on the weight of component B, of acrylonitrile, from 0.2 to 1.99% by weight, based on the weight of component B, of maleic anhydride.

According to the invention, the entirety of the components of the polymer B here gives 100% by weight. The polymer B here is preferably composed of from 65 to 85% by weight of a vinylaromatic monomer, in particular from 70 to 80% by weight, based in each case on the weight of component B. The proportion of acrylonitrile in the polymer B is preferably from 15 to 35% by weight in particular from 20 to 30% by weight, based in each case on the weight of component B.

Suitable vinylaromatic monomers are compounds of the general structure

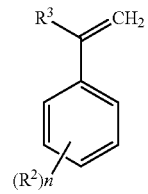

In this formula, $R^3$ can be hydrogen or a C1-C8-alkyl radical, preferably C1-C3-alkyl, in particular methyl. Irrespective of $R^3$, $R^2$ is a C1-C8-alkyl radical, among which preference is given to C1-C3-alkyl. $R^2$ is particularly preferably methyl.

The variable n is a whole number from 0 to 3. n is preferably either 0 or 1.

Examples of suitable vinylaromatic monomers are styrene or alkyl-substituted styrene derivatives, such as α-methylstyrene, particular preference being given here to styrene.

The polymer B is composed of from 0.2 to 1.99% by weight, based on the weight of component B, of maleic anhydride. The proportion of maleic anhydride is preferably from 0.2 to 1.9% by weight in particular from 0.3 to 1.8% by weight, for example from 0.5 to 1.5% by weight, particularly preferably from 0.9 to 1.1% by weight, based in each case on the weight of component B.

In this range, particularly good mechanical properties are achieved with regard to tensile strength.

Accordingly, the present invention also provides a molding composition as described above, where the polymer B comprises from 0.2 to 1.9% by weight, based on the weight of component B, of maleic anhydride.

According to another embodiment, the present invention provides molding compositions as described above, where the polymer B is composed of from 70 to 80% by weight of styrene, from 20 to 30% by weight of acrylonitrile, and from 0.5 to 1.5% by weight of maleic anhydride, based in each case on the weight of component B, the entirety of the monomers giving 100% by weight.

The polymer B can be prepared in a manner known per se. A suitable method is dissolution of the monomer components of the polymer, e.g. of the styrene, maleic anhydride, or acrylonitrile, in a suitable solvent, such as methyl ethyl ketone (MEK). One or, if appropriate, two or more chemical initiators are added to this solution. Suitable initiators are in principle known to the person skilled in the art. Examples of those suitable are peroxides. The mixture is then polymerized for some hours at an elevated temperature.

The solvent and the unreacted monomers are then removed in a manner known per se.

The ratio between the vinylaromatic monomer and the acrylonitrile monomer in the polymer B is preferably from 80:20 to 50:50. The amount of vinylaromatic monomer is preferably selected in such a way as to correspond to the amount of the vinyl monomer in a graft copolymer D present, if appropriate, in the inventive molding composition.

The composition I present in the inventive molding compositions comprises, alongside components A and B, from 2.5 to 60% by weight, based on the weight of the composition I, of glass fibers as component C. The composition I preferably comprises from 4 to 55% by weight, in particular from 5 to 50% by weight for example from 6 to 45% by weight, of glass fibers, based in each case on the weight of the composition I.

For better compatibility with the matrix material, the glass fibers may have been equipped with a size, preferably with a polyurethane size, and with a coupling agent. The diameter of the glass fibers used is generally in the range from 6 to 20 μm.

The glass fibers incorporated may either take the form of short glass fibers or else that of continuous-filament strands (rovings). The average length of the glass fibers is preferably in the range from 0.5 to 50 mm, particularly preferably in the range from 0.08 to 25 mm.

Glass fibers can also be used in the form of textiles, mats, or glass silk rovings.

According to another embodiment of the present invention, the inventive molding compositions can comprise, besides the composition I, an elastomeric polymer or elastomer as further component D. The inventive molding composition can comprise from 0.1 to 50% by weight, based on the weight of the composition I present in the molding composition, of an elastomeric polymer or elastomer.

Accordingly, the present invention also provides a molding composition as described above, where the molding composition comprises, as component D, from 0.1 to 50% by weight, based on the weight of the composition I present in the molding composition, of an elastomeric polymer or elastomer.

Preferred inventive molding compositions comprise amounts of from 0.1 to 50% by weight, in particular from 0.2 to 45% by weight, more preferably from 0.3 to 40% by weight or from 0.4 to 30% by weight, based in each case on the weight of the composition I present in the molding composition, of component D. Particularly preferred molding compositions comprise from 0.5 to 25% by weight, based on the weight of the composition I present in the molding composition, of component D.

The component D used may also comprise mixtures composed of two or more different elastomeric polymers or elastomers.

According to the invention, suitable materials are any of the elastomeric polymers or elastomers known to the person skilled in the art for such applications. Examples of suitable materials are graft rubbers based on butadiene, on butadiene/styrene, on EPDM, or on acrylates.

Accordingly, another embodiment of the present invention provides molding compositions as described above, where the elastomeric polymer or elastomer is a graft rubber based on butadiene, on butadiene/styrene, on EPDM, or on acrylates.

For the purposes of the present invention, in principle any of the elastomeric polymers with $Tg \leq 0°$ C. is suitable as elastomeric polymer or elastomer D, in particular those which comprise, as rubber,
  a diene rubber based on dienes, e.g. butadiene or isoprene,
  an alkyl acrylate rubber based on alkyl esters of acrylic acid, e.g. n-butyl acrylate and 2-ethylhexyl acrylate,
  an EPDM rubber on ethylene, on propylene, and on a diene,
  a silicone rubber based on polyorganosiloxanes,
or a mixture of these rubbers and, respectively, rubber monomers.

The elastomeric polymer or elastomer D is preferably a graft polymer composed of a graft base and of a graft.

Preferred graft polymers D comprise, based on D,
  d1) from 30 to 95% by weight, preferably from 40 to 90% by weight, and particularly preferably from 40 to 85% by weight, of an elastomeric graft base composed of, based on d1)
    d11) from 50 to 100% by weight, preferably from 60 to 100% by weight, and particularly preferably from 70 to 100% by weight, of a (C1-C10-alkyl) ester of acrylic acid,
    d12) from 0 to 10% by weight, preferably from 0 to 5% by weight, and particularly preferably from 0 to 2% by weight, of a polyfunctional, crosslinking monomer,
    d13) from 0 to 40% by weight, preferably from 0 to 30% by weight, and particularly preferably from 0 to 20% by weight, of one or more other monoethylenically unsaturated monomers,
  or of
    d11*) from 50 to 100% by weight, preferably from 60 to 100% by weight, and particularly preferably from 65 to 100% by weight, of a diene having conjugated double bonds,
    d12*) from 0 to 50% by weight, preferably from 0 to 40% by weight, and particularly preferably from 0 to 35% by weight, of one or more monoethylenically unsaturated monomers,
  or of
    d11**) from 50 to 100% by weight, preferably from 60 to 100% by weight, and particularly preferably from 65 to 100% by weight, of a mixture composed of ethylene, of propylene, and of a diene,
    d12**) from 0 to 50% by weight, preferably from 0 to 40% by weight, and particularly preferably from 0 to 35% by weight, of one or more other monoethylenically unsaturated monomers, and
  d2) from 5 to 70% by weight, preferably from 10 to 60% by weight, and particularly preferably from 15 to 60% by weight, of a graft composed of, based on d2),
    d21) from 50 to 100% by weight, preferably from 60 to 100% by weight, and particularly preferably from 65 to 100% by weight, of a styrene compound of the general formula

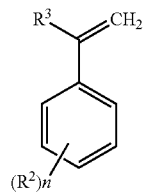

where $R^2$ and $R^3$, independently of one another, are H or C1-C8-alkyl, and n is 0, 1, 2 or 3, d22) from 0 to 40% by weight, preferably from 0 to 38% by weight, and particularly preferably from 0 to 35% by weight, of acrylonitrile or methacrylonitrile, or their mixtures, d23) from 0 to 40% by weight, preferably from 0 to 30% by weight, and particularly preferably from 0 to 20% by weight, of one or more other monoethylenically unsaturated monomers.

The graft shell can also be composed mainly of methyl methacrylate. It is also possible to use products having two or more graft shells.

Particularly suitable (C1-C10-alkyl) esters of acrylic acid, component d11), are ethyl acrylate, 2-ethylhexyl acrylate, and n-butyl acrylate. Preference is given to 2-ethylhexyl acrylate and n-butyl acrylate, and very particular preference is given to n-butyl acrylate. It is also possible to use mixtures of various alkyl acrylates whose alkyl radical differs.

Crosslinking monomers d12) are bi- or polyfunctional comonomers having at least two olefinic double bonds, examples being butadiene and isoprene, divinyl esters of dicarboxylic acids, for example of succinic acid and adipic acid, diallyl and divinyl ethers of dihydric alcohols, for example of ethylene glycol and of 1,4-butanediol, diesters of acrylic acid and methacrylic acid with the dihydric alcohols mentioned, 1,4-divinylbenzene, and triallyl cyanurate. Particular preference is given to the acrylic esters of tricyclodecenyl alcohol (see DE-A 12 60 135), which is known as dihydrodicyclopentadienyl acrylate, and also to the allyl esters of acrylic acid and of methacrylic acid.

Crosslinking monomers d12) may be present or absent in the molding compositions, as a function of the type of molding compositions to be prepared, in particular as a function of the desired properties of the molding compositions.

If crosslinking monomers d12) are present in the molding compositions, the amounts are from 0.01 to 10% by weight, preferably from 0.3 to 8% by weight, and particularly preferably from 1 to 5% by weight, based on d1).

Examples of the other monoethylenically unsaturated monomers d13) which may be present in the graft core d1), replacing to some extent the monomers d11) and d12), are:

vinylaromatic monomers, such as styrene, or styrene derivatives of the above general formula I;
acrylonitrile, methacrylonitrile;
C1-C4-alkyl esters of methacrylic acid, e.g. methyl methacrylate, and also the glycidyl esters glycidyl acrylate and glycidyl methacrylate;
N-substituted maleimides, such as N-methyl-, N-phenyl-, and N-cyclohexylmaleimide;
acrylic acid, methacrylic acid, and also dicarboxylic acids, such as maleic acid, fumaric acid, and itaconic acid, and also their anhydrides, such as maleic anhydride;
nitrogen-functional monomers, such as dimethylaminoethyl acrylate, diethylaminoethyl acrylate, vinylimidazole, vinylpyrrolidone, vinylcaprolactam, vinylcarbazole, vinylaniline, acrylamide and methacrylamide;
aromatic and araliphatic esters of acrylic or methacrylic acid, such as phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate;
unsaturated ethers, such as vinyl methyl ether;
and also mixtures of these monomers.

Preferred monomers d13) are styrene, acrylonitrile, methyl methacrylate, glycidyl acrylate and glycidyl methacrylate, acrylamide and methacrylamide.

It is also possible for the graft base d1) to be composed of the monomers d11*) and d12*) instead of the graft base monomers d11) to d13).

Possible dienes with conjugated double bonds, d11*), are butadiene, isoprene, norbornene and halogen-substituted derivatives of these, such as chloroprene. Butadiene and isoprene are preferred, particularly butadiene.

Other monoethylenically unsaturated monomers d12*) which may be used concomitantly are those mentioned above for the monomers d13).

Preferred monomers d12*) are styrene, acrylonitrile, methyl methacrylate, glycidyl acrylate and glycidyl methacrylate, acrylamide and methacrylamide.

The graft core d1) may also be composed of a mixture of the monomers d11) to d13), and d11*) to d12*).

The graft base d1) may also be composed of the monomers d11) and d12) instead of the graft base monomers d11) to d13) or d11*) and d12*). Particularly suitable dienes used in the monomer mixture d11**), mixed with ethylene and propylene, are ethylidenenorbornene and dicyclopentadiene.

Other monoethylenically unsaturated monomers d12**) which may be used concomitantly are the monomers mentioned for d13).

The graft core may also be composed of a mixture of the monomers d11) to d13) and d11) to d12), or from a mixture of the monomers d11*) to d12*) and d11) to d12), or from a mixture of the monomers d11) to d13), d11*) to d12*) and d11) to d12).

If the graft core comprises the monomers d11) to d13), then blending with a hard phase composed of styrene and acrylonitrile (SAN) gives ASA molding compositions (acrylonitrile-styrene-alkyl acrylate). If the graft core comprises the monomers d11*) to d12*), then blending with a hard phase composed of styrene and acrylonitrile (SAN) gives ABS-type molding compositions (acrylonitrile-butadiene-styrene). If the graft core comprises the monomers d11) to d12), then blending with a hard phase composed of styrene and acrylonitrile (SAN) gives AES-type molding compositions (acrylonitrile-EPDM-styrene). In a preferred embodiment, therefore, the elastomeric polymer or elastomer D involves ASA graft polymers, or ABS graft polymers, or AES graft polymers, or mixed types composed of ASA, ABS, and AES graft polymers.

Particular monomers d21) are styrene compounds of the general formula

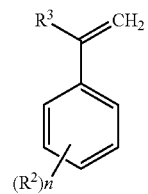

where $R^2$ and $R^3$, independently of one another, are H or C1-C8-alkyl, and n is 0, 1, 2 or 3.

The monomer d21) used preferably comprises styrene, α-methylstyrene, or else C1-C8-alkyl-ring-alkylated styrenes, such as p-methylstyrene or tert-butylstyrene. Styrene is particularly preferred. It is also possible to use mixtures of the styrenes mentioned, in particular of styrene and α-methylstyrene.

Instead of the styrene compounds, or in a mixture therewith, it is possible to use C1-C8-alkyl esters of acrylic acid and/or methacrylic acid, particularly those which derive from methanol, from ethanol, from n- and isopropanol, from sec-, tert-, and isobutanol, from pentanol, from hexanol, from heptanol, from octanol, from 2-ethylhexanol, and from n-butanol. Methyl methacrylate is particularly preferred.

Monomer d23) is a monoethylenically unsaturated monomer. Examples of compounds suitable as monomer d23) are:
 N-substituted maleimides, such as N-methyl-, N-phenyl-, and N-cyclohexylmaleimide;
 acrylic acid, methacrylic acid, and also dicarboxylic acids, such as maleic acid, fumaric acid, and itaconic acid, and also their anhydrides, such as maleic anhydride;
 nitrogen-functional monomers, such as dimethylaminoethyl acrylate, diethylaminoethyl acrylate, vinylimidazole, vinylpyrrolidone, vinylcaprolactam, vinylcarbazole, vinylaniline, acrylamide and methacrylamide;
 aromatic and araliphatic esters of acrylic or methacrylic acid, such as phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate;
 unsaturated ethers, such as vinyl methyl ether,
and also mixtures of these monomers.

Accordingly, the graft shell d2) can comprise other monomers d22), or d23), with some extent of reduction in the amount of the monomers d21). The graft shell d2) is preferably composed of polymers selected from the group consisting of polystyrene, copolymers composed of styrene and acrylonitrile, copolymers composed of α-methylstyrene and acrylonitrile, and copolymers composed of styrene and methyl methacrylate.

The graft d2) can be prepared under the conditions used for preparing the graft base d1), and the graft d2) here may be prepared in one or more steps of the process. The monomers d21), d22), and d23) here may be added individually or in a mixture with one another. The ratio of monomers in the mixture may be constant over time or may be graduated. Combinations of these procedures are also possible.

For example, styrene may first be polymerized alone onto the graft base d1), and may be followed by a mixture of styrene and acrylonitrile.

The overall constitution is independent of the embodiments of the process mentioned.

Other suitable graft polymers, especially for relatively large particles, have two or more "soft" and "hard" stages, for example having the structure d1)-d2)-d1)-d2) or d2)-d1)-d2).

To the extent that ungrafted polymers are produced from the monomers d2) during the grafting process, any amounts of these, which are generally below 10% by weight of d2), are counted with the weight of component D.

The graft polymers D can be prepared in various ways, in particular in emulsion, in microemulsion, in miniemulsion, in suspension, in microsuspension, in minisuspension, by precipitation polymerization, in bulk, or in solution, either continuously or batchwise.

In emulsion polymerization and variants thereof (microemulsion, miniemulsion) the monomers are emulsified in water, and to this end concomitant use is made of emulsifiers. The emulsifiers suitable for stabilizing the emulsion are soap-like auxiliaries which encapsulate the monomer droplets and thus prevent them from coalescing.

Suitable emulsifiers are the anionic, cationic or neutral (nonionic) emulsifiers known to the skilled worker. Examples of anionic emulsifiers are alkali metal salts of higher fatty acids having from 10 to 30 carbon atoms, such as palmitic, stearic or oleic acid, alkali metal salts of sulfonic acids having, for example, from 10 to 16 carbon atoms, in particular the sodium salts of alkyl- or alkylarylsulfonic acids, alkali metal salts of monoesters of phthalic acid, and alkali metal salts of resin acids, such as abietic acid. Examples of cationic emulsifiers are salts of long-chain amines, in particular unsaturated amines, having from 12 to 18 carbon atoms, or quaternary ammonium compounds with relatively long-chain olefinic or paraffinic radicals (i.e. salts of quaternized fatty amines). Examples of neutral emulsifiers are ethoxylated fatty alcohols, ethoxylated fatty acids and ethoxylated phenols and fatty acid esters of polyhydric alcohols, such as pentaerythritol or sorbitol.

Initiators used for the emulsion polymerization are preferably those which have low solubility in the monomer, but good solubility in water. It is therefore preferable to use peroxosulfates, such as those of potassium, sodium or ammonium, or else redox systems, in particular those based on hydroperoxides, such as cumene hydroperoxide, dicumyl peroxide, benzoyl peroxide or lauryl peroxide.

If redox systems are used, concomitant use is made of water-soluble metal compounds whose metal cations can easily change their oxidation state, e.g. iron sulfate hydrate.

Concomitant use is usually also made of complexing agents, such as sodium pyrophosphate or ethylenediaminetetraacetic acid, which prevent precipitation of low-solubility metal compounds during the polymerization. Reducing agents generally used in the case of redox systems are organic compounds, such as dextrose, glucose and/or sulfoxylates.

Other additives which may be used during the polymerization reaction are buffer substances, such as $Na_2HPO_4$/$NaH_2PO_4$ or Na citrate/citric acid, in order to set a substantially constant pH. Molecular weight regulators can also be used concomitantly, examples being mercaptans, such as tert-dodecyl mercaptan, or ethylhexyl thioglycolate. Like the emulsifiers and initiators or redox systems, these other additives can be added continuously or batchwise at the start and/or during preparation of the emulsion and/or during the polymerization reaction.

The selection of the precise polymerization conditions, in particular the nature, amount, and method of feed of the emulsifier and of the other polymerization auxiliaries, is preferably such that the resultant latex of the graft polymer has an average particle size, defined via the d50 value of the particle size distribution, of from 50 to 1000 nm, preferably from 100 to 600 nm, and particularly preferably from 150 to 450 nm.

By way of example, the particle size distribution can be monomodal or bimodal. It is preferable to achieve a bimodal particle size distribution via (partial) agglomeration of the polymer particles. The procedure for this can by way of example be as follows: the monomers d1) which compose the core are polymerized to a conversion which is usually at least 90%, preferably greater than 95%, based on the monomers used. The resultant rubber latex generally has an average particle size d50 of at most 200 nm and a narrow particle size distribution (almost monodisperse system).

In the second stage, the rubber latex is agglomerated. This generally takes place via addition of a dispersion of an acrylic ester polymer (see DE-A 24 27 960). It is preferable to use dispersions of copolymers of (C1-C4-alkyl) esters of acrylic acid, preferably of ethyl acrylate, having from 0.1 to 20% by weight of monomers which form polar polymers, e.g. acrylic acid, methacrylic acid, acrylamide, or methacrylamide, N-methylolmethacrylamide, or N-vinylpyrrolidone. Particular preference is given to a copolymer composed of 96% of ethyl acrylate and 4% of methacrylamide. The concentration of the acrylic ester polymers in the dispersion used for the agglomeration process is generally to be from 3 to 40% by weight, preferably from 5 to 20% by weight.

Under the conditions mentioned, only some of the rubber particles are agglomerated, thus producing a bimodal distribution. In a first embodiment here, more than 50%, preferably from 75 to 95%, of the particles (numeric distribution) are present in the non-agglomerated state after the agglomeration process.

According to a second embodiment, the manner of carrying out the agglomeration is such that after the agglomeration process the polymer particles have a polymodal particle size distribution in which less than 40% by weight, preferably less than 37.5% by weight, more preferably less than 35% by weight, particularly preferably less than 32.5% by weight, in particular less than 30% by weight, of the particles are present in each particle size range of width 50 nm. The average particle diameter here is based on weight unless otherwise stated. In particular, it is the d50 value of the cumulative weight distribution, determined with the aid of an ultracentrifuge. The particle size distribution is likewise preferably determined with the aid of an ultracentrifuge as explained in more detail below. In determining the particle size distribution, the cumulative mass or weight is generally plotted as a function of particle size. If any desired particle size range of width 50 nm is then selected, then according to this embodiment the increase in cumulative weight or mass is less than 40% by weight, preferably less than 37.5% by weight, more preferably less than 35% by weight, particularly preferably less than 32.5% by weight, and in particular less than 30% by weight. The particle sizes in an agglomerated latex are usually within the range of up to 1000 nm. The 50 nm range is therefore generally within this region of particle size up to 1000 nm. According to this second embodiment, the above condition has to be met for any particle size window of width 50 nm at any position that may be chosen.

In the particulate emulsion polymer it is preferable, in this embodiment, for the ratio $D_w/D_n$ of weight-average particle size d50 to number-average particle size d50 to be <5, particularly preferably <4, in particular <3. It is preferable for the plot of cumulative weight against particle size to rise continuously. This means that there is no plateau in the function between 0 and 100% by weight, but instead the curve rises constantly.

In this second embodiment, the particle size of the agglomerating acrylic ester polymer latex is preferably approximately within the range of particle size of the latex to be agglomerated. The ratio of the average particle size of the acrylic ester latex to the average particle size of the substrate latex in this second embodiment is preferably from 0.2 to 2, particularly preferably from 0.5 to 1.5.

In this embodiment, the agglomeration process is preferably carried out at from 20 to 120° C., particularly preferably from 30 to 100° C. The manner of addition of the agglomeration latex is preferably such that from 1 to 1/100 of the entire amount of the agglomeration latex to be added is introduced per minute. The agglomeration time is preferably from 1 minute to 2 hours, particularly preferably from 10 to 60 minutes.

In this second embodiment, the amount of the agglomeration latex, based on the latex to be agglomerated, is preferably from 0.1 to 20% by weight, with preference from 0.5 to 10% by weight, in particular from 1 to 5% by weight, based on solids.

The emulsion polymerization reaction is generally undertaken under conditions of slow or moderate stirring.

Microemulsion polymerization differs from normal emulsion polymerization especially in that high shear forces are used to prepare an emulsion from the monomers, water and the emulsifiers. The homogenizers used for this are known to the skilled worker, examples of these being: Dispermat laboratory dissolver, VMA-Getzmann, Reichshof, Germany, UltraTurrax, Janke und Kunkel, Staufen, Germany, rotor-stator system devices, such as the Dispax, Janke und Kunkel, Staufen, Germany. These devices are usually operated at rotation rates of from 1000 to 25 000 rpm, preferably 2000 to 25 000 rpm.

Miniemulsion polymerization differs from normal emulsion polymerization and from microemulsion polymerization mainly in that the particle size is generally from 30 to 500 nm (i.e. between the particle sizes typical of emulsion and of microemulsion polymerization) and in that the particles are usually stabilized by a combination of ionic emulsifiers and co-emulsifiers to prevent coalescence. In miniemulsion, the mixture made from monomers, water, emulsifiers and co-emulsifiers is subjected to high shear forces, giving intimate mixing of the components. This is followed by polymerization. The high shear forces may be created by ultrasound or by a microfluidizer device, for example. The co-emulsifiers used are compounds which cause the droplets formed prior to the start of the polymerization to be very small but not thermodynamically stable (see Gilbert, "Emulsion Polymerization, A Mechanistic Approach", Academic Press, London San Diego 1995, pp. 12-14). The co-emulsifiers usually used are long-chain alkanes, such as hexadecane, or long-chain alcohols, such as hexadecanol (cetyl alcohol) or dodecanol.

In suspension polymerization and its variants (microsuspension, minisuspension) the monomers are suspended in water, and to this end, concomitant use is made of protective colloids. Suitable protective colloids are cellulose derivatives, such as carboxymethylcellulose and hydroxymethylcellulose, poly-N-vinylpyrrolidone, polyvinyl alcohol and polyethylene oxide, anionic polymers, such as polyacrylic acid and copolymers thereof and cationic polymers, such as poly-N-vinylimidazole. The amount of these protective colloids is preferably from 0.1 to 5% by weight, based on the total weight of the emulsion. It is preferable for one or more polyvinyl alcohols to be used as protective colloid, in particular those with a degree of hydrolysis below 96 mol %.

In addition to the protective colloids, concomitant use may be made of colloidal silica at concentrations of generally from 0.2 to 5% by weight, based on the amount of the dispersion.

Preferred initiators for suspension polymerization have a half-life time of one hour at from 40 to 150° C. and marked solubility in the monomers but poor solubility in water. Use is therefore made of organic peroxides, organic hydroperoxides, azo compounds and/or compounds having C═C single bonds as initiators RI. Monomers which polymerize spontaneously at an elevated temperature may likewise be used as free-radical polymerization initiators. It is also possible to use mixtures of the initiators RI mentioned. Preferred peroxides are those with hydrophobic properties. Dilauryl peroxide and dibenzoyl peroxide are very particularly preferred. Preferred azo compounds are 2,2'-azobis(2-methylbutyronitrile) and 2,2'-azobis(isobutyronitrile).

Preferred compounds having labile C═C bonds are 3,4-dimethyl-3,4-diphenylhexane and 2,3-dimethyl-2,3-diphenylbutane.

The polymerization reaction is generally conducted with slow or moderate stirring.

Microsuspension polymerization differs from normal suspension polymerization mainly in that high shear forces are used to prepare a fine-particle suspension. Details were described above under microemulsion polymerization.

Minisuspension polymerization differs from normal suspension polymerization and from microsuspension polymerization mainly in that the particle sizes are generally between those for suspension polymerization and those for microsuspension polymerization.

In precipitation polymerization the monomers used are soluble in the continuous phase (e.g. solvent or a solvent mixture), but the polymers produced are insoluble or have only limited solubility, and therefore precipitate during the polymerization. It is also possible to use bulk polymerization processes, in which the polymer produced is insoluble in the monomer and therefore precipitates. Depending on the reaction medium, it is possible to use the initiators described for emulsion or suspension polymerization. Thermal initiation may also be used.

In bulk polymerization the monomers are polymerized without adding any reaction medium, using the monomer-soluble initiators mentioned, i.e. the monomers are the reaction medium. Thermal initiation may also be used.

Solution polymerization differs from bulk polymerization mainly in that concomitant use is made of an organic solvent, such as cyclohexane, ethylbenzene or dimethyl sulfoxide to dilute the monomers. It is also possible to use the initiators mentioned, or thermal initiation may be used.

The process for preparing the graft polymers may also be carried out as a combined process in which at least two of the polymerization processes described above are combined with one another. Particular mention should be made here of bulk/solution, solution/precipitation, bulk/suspension and bulk/emulsion, in each case beginning with the process mentioned first and finishing with the process mentioned last.

The inventive molding compositions can comprise, as further component E alongside the composition I, additives, such as processing aids or mixtures of different additives.

The proportion of component E is generally up to 50% by weight, for example from 0.1 to 50% by weight, preferably from 0.1 up to 40% by weight, in particular from 0.5 to 35% by weight, based in each case on the weight of the composition I present in the molding composition.

Accordingly, another embodiment of the present invention provides molding compositions as described above, where the molding composition comprises, as component E, from 0.1 to 50% by weight, based on the weight of the composition I present in the molding composition, of other additives.

For the purposes of the present invention, examples of other additives are stabilizers and oxidation retarders, agents to counter decomposition by heat and decomposition by ultraviolet light, lubricants and mold-release agents, dyes, and pigments, and plasticizers.

The amounts generally present of pigments and dyes are up to 6% by weight, preferably from 0.5 to 5% by weight, and in particular form 0.5 to 3% by weight.

The pigments for pigmenting thermoplastics are well known (see, for example, R. Gächter and H. Müller, Taschenbuch der Kunststoffadditive [Plastics additives handbook], Carl Hanser Verlag, 1983, pp. 494-510. A first preferred group of pigments is that of white pigments, such as zinc oxide, zinc sulfide, white lead, lithopones, antimony white and titanium dioxide. Of the two most commonly encountered crystalline forms of titanium dioxide (rutile and anatase) it is in particular the rutile form which is used for white coloration of the inventive molding composition.

Black color pigments which may be used according to the invention are iron oxide black, spinel black, manganese black (a mixture of manganese dioxide, silicon oxide, and iron oxide), cobalt black, and antimony black, and also particularly preferably carbon black, mostly used in the form of furnace black or gas black (see in this connection G. Benzing, Pigmente für Anstrichmittel [Pigments for paints], Expert-Verlag (1988), pp. 78 et seq.).

According to the invention, it is, of course, also possible to achieve particular shades by using inorganic chromatic pigments, such as chromium oxide green, or organic chromatic pigments, such as azo pigments or phthalocyanines. Pigments of this type are widely available commercially.

Examples of oxidation retarders and heat stabilizers which may be added to the thermoplastic materials according to the invention are halides of metals of group I of the Periodic Table of the Elements, e.g. sodium halides, potassium halides, lithium halides. It is also possible to use zinc fluoride and zinc chloride. It is also possible to use sterically hindered phenols, hydroquinones, substituted representatives of this group, secondary aromatic amines, if appropriate in combination with phosphorus-containing acids, or their salts, and mixtures of these compounds, preferably at concentrations of up to 1% by weight, based on the weight of the composition I.

Examples of UV stabilizers are various substituted resorcinols, salicylates, benzotriazoles, and benzophenones, the amounts used generally being up to 2% by weight.

Lubricants and mold-release agents, generally used in amounts of up to 1% by weight of the thermoplastic material, are stearic acid, stearyl alcohol, alkyl stearates, and stearamides, and also esters of pentaerythritol with long-chain fatty acids. It is also possible to use stearates of calcium, of zinc, or of aluminum, or else dialkyl ketones, e.g. distearyl ketone. By way of example, calcium stearate is suitable according to the invention.

Other additives which may be used are nucleating agents, such as talc.

The inventive molding compositions can be prepared via mixing of the components in a manner known per se.

Non-liquid components are advantageously used in finely ground form. Products with an average particle size smaller than 100 μm, preferably smaller than 50 μm, have particularly good suitability. The components can be mixed simultaneously, together, or successively.

In principle, the inventive molding compositions can be prepared by processes known per se, such as extrusion. By way of example, the inventive molding compositions can be prepared by mixing the starting components in conventional mixing apparatus, such as screw extruders, preferably twin-screw extruders, Brabender mixers, or Banbury mixers, or else kneaders, and then extruding the materials. The extrudate is preferably cooled and comminuted. The sequence of mixing of the components can be varied. For example, two or more components can be premixed. For the purposes of the present invention, it is likewise possible, however, to mix all of the components together.

In order to obtain maximum homogeneity of mixing, intensive mixing is advantageous. This generally requires average mixing times of from 0.2 to 30 minutes at temperatures of from 200 to 320° C., preferably from 225 to 310° C. The extrudate can be cooled and comminuted.

The components are advantageously mixed in an extruder, and the mixing process preferably takes place in the melt.

Accordingly, the present invention also provides a process for preparing a molding composition as described above, comprising the mixing of from 40 to 95% by weight of a copolymer comprising from 55 to 90% by weight of α-methylstyrene and from 10 to 50% by weight of acrylonitrile, and also from 0 to 5% by weight of other monomers as component A, from 2.5 to 75% by weight of a polymer B, composed of from 60 to 90% by weight of a vinylaromatic monomer, from 8.01 to 39.8% by weight of acrylonitrile, and from 0.2 to 1.99% by weight of maleic anhydride, and from 2.5 to 60% by weight of glass fibers as component C.

The present invention further relates to this process further comprising the extrusion of a material comprising from 40 to 95% by weight of a copolymer comprising from 55 to 90% by weight of α-methylstyrene and from 10 to 50% by weight of acrylonitrile, and also from 0 to 5% by weight of other monomers as component A, from 2.5 to 75% by weight of a polymer B, composed of from 60 to 90% by weight of a vinylaromatic monomer, from 8.01 to 39.8% by weight of acrylonitrile, from 0.2 to 1.99% by weight of maleic anhydride, and from 2.5 to 60% by weight of glass fibers as component C, at a temperature in the range from 200 to 320° C.

The present invention further provides a molding composition obtainable via the processes described above.

For the purposes of the present invention, the term "molding composition" means a material according to one of the abovementioned compositions, which can be subjected to a forming process via at least one suitable step. Accordingly, moldings can be produced from the inventive molding compositions via a forming process. The molding compositions can also be converted into foils, films, and foams. The molding compositions therefore have advantageous mechanical properties for this type of use.

The molding compositions can be molded via a shaping step, for example via injection molding, extrusion, compression molding, or pelletization, to give moldings such as granules, beads, pellets, tablets.

Accordingly, the present invention also provides a process as described above additionally comprising processing of the molding composition to give a molding.

Another embodiment of the present invention also provides a molding obtainable via a process as described above.

Further moldings can be produced from the inventive moldings. By way of example, it is possible to melt inventive granules and, if appropriate with addition of at least one suitable additive, to process them to give a further molding. Examples which may be mentioned of suitable additives are the abovementioned components.

Accordingly, the present invention also provides a molding which comprises at least 10% by weight, preferably at least 20% by weight, more preferably at least 50% by weight, and particularly preferably at least 90% by weight, for example 90, 91, 92, 93, 94, 95, 96, 97, 98, 99, or 100% by weight, of the inventive molding composition.

Particularly preferred moldings according to the present invention are granules which comprise 100% by weight of the inventive molding composition. The granule particles moreover have a size in the range from 1 to 6 mm, more preferably from 1.5 to 5 mm, and particularly preferably from 2 to 4 mm. The geometry of the moldings is in principle subject to no restrictions and can, as a function of the specific production process, be of cylindrical, lenticular, bead, or other shape, for example.

The inventive molding compositions and moldings feature good thermal stability together with good mechanical properties.

The present invention further provides the use of a molding composition as described above for production of a molding, where the molding is a toy or a part of a toy, or is an automobile accessory, aircraft accessory, or ship accessory, or a part of an automobile accessory, of an aircraft accessory, or of a ship accessory, or is packaging or a part of packaging, or is a container or a part of a container, or is a household device or a part of a household device, or is a medical device or a part of a medical device, or is a constituent of a cosmetic item, or is a part of an electrical or electronic apparatus, or is an apparatus used in house construction or a part of such an apparatus.

Examples of specific uses are clips, fasteners, snap connectors, spring elements, loudspeaker grilles, valve bodies for WC cisterns, rollers, levers, guides for, by way of example, motor-vehicle sliding roofs, gearbox components, adjustment drives, coffee-brewing units, sprinkler systems, switches, ball sockets for joints, pendulum supports for motor vehicles, non-return valves, windshield-washer nozzles for motor vehicles, motor-vehicle-interior parts, inner tubes for Bowden cables, holders for sun visors for motor vehicles, press buttons, wind-up mechanisms for safety belts, grinders, outsert chassis, chair back-rests, gas meters (measurement-chamber casing and functional parts), window fittings or door fittings, computer parts, printer parts, and decorative items.

The examples below illustrate the present invention.

EXAMPLES

Test Methods

Molar Mass Determination

The viscosity number of the copolymers is determined to DIN 53 727 on 0.5% strength by weight solutions in DMF.

Preparation and Testing of Molding Compositions

The granules are processed at 260° C. mass temperature and 60° C. mold temperature.

Heat resistance of the specimens was determined by means of the Vicat softening point. The Vicat softening point was determined to DIN 53 460 using a force of 49.05 N and a temperature rise of 50 K per hour, on standard small specimens.

Impact resistance of the products was determined on ISO specimens to ISO 179 1 eU.

Flowability was determined to ISO 1133 at 240° C. with a load of 5 kg.

Stiffness of the materials is characterized via the modulus of elasticity determined in the tensile test to ISO 527. Tensile strain at break is also determined in this test.

Components Used

Component A1

Copolymer composed of 70% by weight of α-methylstyrene and 30% by weight of acrylonitrile, characterized via a viscosity number of 66 ml/g (measured at 25° C. in 0.5% strength by weight DMF solution)

Component Ac

Styrene-acrylonitrile copolymer having 75% by weight of styrene and 25% by weight of acrylonitrile and having a viscosity number of 66 ml/g (measured at 25° C. in 0.5% strength by weight DMF solution)

Component BS

S-AN-MA terpolymer (74/25/1% by weight) with VN 80 ml/g

Component B2

S-AN-MA terpolymer (74/25/1% by weight) with VN 65 ml/g

Component B3

S-AN-MA terpolymer (73.2/24.9/1.9% by weight) with VN 66 ml/g

Component Bc1

S-AN-MA terpolymer (70.6/23.7/5.7% by weight) with VN 80 ml/g

Component C
Glass fibers with an aminosilane size, fiber diameter 10 µm, staple fibers of length 4.5 mm Component D1
Graft rubber having 70% by weight of polybutadiene in the core and 30% by weight of a graft shell composed of 75% by weight of styrene and 25% by weight of acrylonitrile. Average particle size about 370 nm.

Component E1
Calcium stearate (Ceasit AV 40 from Company Bärlocher)

Preparation of Molding Compositions

The components were mixed in a twin-screw extruder at a mass temperature of from 240 to 290° C. The melt was passed through a water bath and granulated.

The compositions of the molding compositions and the results of the measurements are listed in table 1.

TABLE 1

| Components [% by weight] | Molding composition | | | | | | | | |
|---|---|---|---|---|---|---|---|---|---|
| | c1 | 2 | 3 | c4 | c5 | 6 | 7 | c8 | 9 |
| A1 | 85 | 80 | 80 | — | 80 | 75 | 74.8 | — | 75 |
| Ac | — | — | — | 80 | — | — | — | 75 | — |
| B1 | — | 5 | — | 5 | — | 5 | 5 | 5 | — |
| B2 | — | — | 5 | — | — | — | — | — | — |
| B3 | — | — | — | — | — | — | — | — | 5 |
| Bc1 | — | — | — | — | 5 | — | — | — | — |
| C | 15 | 15 | 15 | 15 | 15 | 15 | 15 | 15 | 15 |
| D1 | — | — | — | — | — | 5 | 5 | 5 | 5 |
| E1 | — | — | — | — | — | — | 0.2 | — | — |

| | Molding composition | | | | | | | | |
|---|---|---|---|---|---|---|---|---|---|
| | 1 | 2 | 3 | 4 | 5 | 6 | 7 | 8 | 9 |
| Vicat temp. [° C.] | 122 | 121 | 120 | 112 | 122 | 120 | 120 | 108 | 120 |
| MVI [ml/10'] | 7.6 | 6.2 | 9.7 | 10.7 | 7.2 | 4.6 | 5.9 | 9.6 | 5.8 |
| an, RT [kJ/m²] | 11.8 | 17.7 | 16.9 | 15.4 | 12.0 | 26.2 | 28.4 | 26.2 | 27.6 |
| Modulus of elasticity [MPa] | 7075 | 6950 | 6940 | 6970 | 7005 | 6545 | 6450 | 6480 | 6480 |
| Tensile strain at break [%] | 1.6 | 1.8 | 1.7 | 1.7 | 1.5 | 2.5 | 2.6 | 2.4 | 2.6 |

The invention claimed is:

1. A molding composition comprising: a composition (I) present in an amount of 10 to 100% by weight, based on the molding composition, wherein the composition (I) consists of:
    as component (A) 40 to 95% by weight, based on the composition (I), of a copolymer comprising:
        α-methylstyrene in an amount of 55 to 90% by weight,
        acrylonitrile in an amount of at least 10% by weight, and
        one or more other monomers in an amount of 0 to 5% by weight,
    wherein the percentages by weight of the α-methylstyrene, the acrylonitrile and the one or more other monomers are based on the weight of component (A) and total 100%;
    as component (B) at least 2.5% by weight, based on the composition (I), of a polymer comprising:
        a vinylaromatic monomer in an amount of 60 to 90% by weight,
        acrylonitrile in an amount of 8.01 to 39.8% by weight, and
        maleic anhydride in an amount of 0.5 to 1.5% by weight,
    wherein the percentages by weight of the vinylaromatic monomer, the acrylonitrile and the maleic anhydride are based on the weight of component (B) and total 100%;
    as component (C) at least 2.5% by weight, based on the composition (I), of glass fibres;
    optionally, as component (D), an elastomeric polymer or elastomer in an amount of 0.1 to 50% by weight, based on the weight of the composition (I); and
    optionally, as component (E), one or more additives in an amount of 0.1 to 50% by weight, based on the weight of the composition (I);
    wherein components A, B, C and optionally D and/or E do not exceed 100% by weight of the composition (I).

2. The molding composition according to claim 1, wherein the component (B) polymer comprises 70 to 80% by weight of styrene, 20 to 30% by weight of acrylonitrile, and 0.5 to 1.5% by weight of maleic anhydride.

3. The molding composition according to claim 1, wherein the elastomeric polymer or elastomer is a graft rubber based on butadiene, butadiene/styrene, EPDM, or acrylates.

4. The molding composition according to claim 1, wherein component (E) is present in an amount of 0.1 to 50% by weight, based on the weight of the composition (I).

5. A process comprising:
    providing a composition (I) consisting of 40 to 95% by weight of a component (A), at least 2.5% by weight of a component (B) at least 2.5% by weight of glass fibres as a component (C), optionally 0.1 to 50% by weight of an elastomeric polymer or elastomer as component (D), and optionally 0.1 to 50% by weight of one or more additives as component (E), the percentages by weight based on a combined weight of components (A), (B), (C), and optionally (D) and/or (E)-totaling 100%;
    wherein component (A) comprises α-methylstyrene in an amount of 55 to 90% by weight, acrylonitrile in an amount of at least 10% by weight, and one or more other monomers in an amount of 0 to 5% by weight, based on the weight of component (A) and total 100%;
    wherein component (B) comprises a vinylaromatic monomer in an amount of 60 to 90% by weight, acrylonitrile in an amount of 8.01 to 39.8% by weight, and maleic anhydride in an amount 0.5 to 1.5% by weight, wherein the percentages by weight of the vinylaromatic monomer, the acrylonitrile and the maleic anhydride are based on the weight of component (B) and total 100%; and mixing components (A), (B), (C), and optionally (D) and/or (E) to provide a composition (I); and forming a molding composition comprising 10 to 100% by weight of the composition (I).

6. The process according to claim 5, further comprising extruding the molding composition at a temperature of 200 to 320° C.

7. The process according to claim 5, further comprising processing the molding composition to provide a molding.

8. The process according to claim 6, further comprising processing the extrudate to provide a molding.

9. A molding prepared by a process according to claim 7.

10. A molding prepared by a process according to claim 8.

11. A molding composition comprising: a composition (I) present in an amount of 10 to 100% by weight, based on the molding composition, wherein the composition (I) consists of:

as component (A) 40 to 95% by weight, based on the composition (I), of a copolymer comprising:
α-methylstyrene in an amount of 55 to 90% by weight,
acrylonitrile in an amount of at least 10% by weight, and
one or more other monomers in an amount of 0 to 5% by weight,
wherein the percentages by weight of the α-methylstyrene, the acrylonitrile and the one or more other monomers are based on the weight of component (A) and total 100%;

as component (B) at least 2.5% by weight, based on the composition (I), of a polymer comprising:
a vinylaromatic monomer in an amount of 60 to 90% by weight
acrylonitrile in an amount of 8.01 to 39.8% by weight, and
maleic anhydride in an amount of 0.5 to 1.5% by weight,
wherein the percentages by weight of the vinylaromatic monomer, the acrylonitrile and the maleic anhydride are based on the weight of component (B) and total 100%; and as component (C) at least 2.5% by weight, based on the composition (I), of glass fibres;

optionally as component (D) an elastomeric polymer or elastomer in an amount of 0.1 to 50% by weight, based on the weight of the composition (I);

and optionally as component (E) one or more additives in an amount of 0.1 to 50% by weight, based on the weight of the composition (I);

wherein components A, B, C and optionally (D) and optionally (E) not exceed 100% by weight of the composition (I).

12. The molding composition according to claim 11, wherein the component (B) polymer comprises 70 to 80% by weight of styrene, 20 to 30% by weight of acrylonitrile, and 0.5 to 1.5% by weight of maleic anhydride.

13. The molding composition according to claim 11, wherein the elastomeric polymer or elastomer is a graft rubber based on butadiene, butadiene/styrene, EPDM, or acrylates.

14. The molding composition according to claim 1, wherein component (A) is a copolymer consisting of α-methylstyrene in an amount of 55 to 90% by weight, acrylonitrile in an amount of 8.01 to 39.8% by weight and maleic anhydride in an amount of 0.5 to 1.5% by weigh based on component (B).

15. The molding composition according to claim 1, wherein component B has a viscosity number ≤66 ml/g.

16. The molding composition of claim 1, wherein the molding composition consists essentially of the composition (I).

17. The molding composition of claim 1, wherein the molding composition consists of the composition (I).

18. The molding composition of claim 1, wherein component (E) is selected from the group consisting of stabilizers, oxidation ertarders, agents to counter decomposition by heat and decomposition by ultraviolet light, lubricants, mold-release agents, dyes, pigments, plasticizers, and combinations thereof.

19. The molding composition of claim 17, wherein component (E) is selected from the group consisting of stabilizers, oxidation ertarders, agents to counter decomposition by heat and decomposition by ultraviolet light, lubricants, mold-release agents, dyes, pigments, plasticizers, and combinations thereof.

* * * * *